US012619679B2

(12) United States Patent
Ermans et al.

(10) Patent No.: US 12,619,679 B2
(45) Date of Patent: May 5, 2026

(54) METHOD FOR GENERATING A DETAILED VISUALIZATION OF MACHINE LEARNING MODEL BEHAVIOR

(71) Applicant: NXP B.V., Eindhoven (NL)

(72) Inventors: Brian Ermans, 's-Hertogenbosch (NL); Peter Doliwa, Hamburg (DE); Gerardus Antonius Franciscus Derks, Dongen (NL); Wilhelmus Petrus Adrianus Johannus Michiels, Reusel (NL); Frederik Dirk Schalij, Eindhoven (NL)

( * ) Notice: Subject to any disclaimer, the term of this patent is extended or adjusted under 35 U.S.C. 154(b) by 1146 days.

(21) Appl. No.: 17/444,682

(22) Filed: Aug. 9, 2021

(65) Prior Publication Data

US 2023/0040470 A1 Feb. 9, 2023

(51) Int. Cl.
| | |
|---|---|
| *G06F 18/213* | (2023.01) |
| *G06F 18/20* | (2023.01) |
| *G06F 18/211* | (2023.01) |
| *G06N 3/08* | (2023.01) |

(52) U.S. Cl.
CPC .......... *G06F 18/213* (2023.01); *G06F 18/211* (2023.01); *G06F 18/285* (2023.01); *G06N 3/08* (2013.01)

(58) Field of Classification Search
CPC .... G06F 18/213; G06F 18/211; G06F 18/285; G06N 3/08–0985
See application file for complete search history.

(56) References Cited

U.S. PATENT DOCUMENTS

| | | | |
|---|---|---|---|
| 2016/0321784 A1* | 11/2016 | Annapureddy | ........ G06V 10/82 |
| 2019/0287264 A1* | 9/2019 | Chalamala | ............. G06V 10/82 |
| 2019/0303677 A1* | 10/2019 | Choutas | ................... G06N 3/09 |
| 2021/0012156 A1* | 1/2021 | Vijaykeerthy | ......... G06N 3/084 |
| 2021/0089827 A1* | 3/2021 | Kumagai | ............... G06N 3/045 |
| 2021/0097645 A1* | 4/2021 | Navarrete Michelini | ................... |
| | | | G06T 3/4023 |
| 2021/0174497 A1* | 6/2021 | Yoo | .......................... G06F 18/24 |
| 2021/0232927 A1* | 7/2021 | Lin | ......................... G06N 3/063 |
| 2021/0241776 A1* | 8/2021 | Sivaraman | ............... G06N 3/08 |

(Continued)

OTHER PUBLICATIONS

Kanazawa et al., Locally Scale-Invariant Convolutional Neural Network, Dec. 16, 2014, ArXiv, pp. 1-11 (Year: 2014).*

(Continued)

*Primary Examiner* — James Trujillo

(57) ABSTRACT
A method is provided for generating a visualization for explaining a behavior of a machine learning (ML) model. In the method, an image is input to the ML model for an inference operation. The input image has an increased resolution compared to an image resolution the ML model was intended to receive as an input. A resolution of a plurality of resolution-independent convolutional layers of the neural network are adjusted because of the increased resolution of the input image. A resolution-independent convolutional layer of the neural network is selected. The selected resolution-independent convolutional layer is used to generate a plurality of activation maps. The plurality of activation maps is used in a visualization method to show what features of the image were important for the ML model to derive an inference conclusion. The method may be implemented in a computer program having instructions executable by a processor.

20 Claims, 5 Drawing Sheets

(56)  References Cited

U.S. PATENT DOCUMENTS

2021/0295019 A1*  9/2021  Sun .......................... G06N 3/082
2021/0366080 A1*  11/2021  Jung ..................... G06F 18/213

OTHER PUBLICATIONS

JP 6723488 B1 (with English translation) (Year: 2020).*
Hashemi, Mahdi; "Enlarging Smaller Images Before Inputting Into Convolutional Neural Network: Zero-Padding Vs. Interpolation"; Journal of Big Data 6, Article No. 98; Accepted Nov. 4, 2019 and Published online Nov. 14, 2019; https://doi.org/10.1186/s40537-019-0263-7.
Morbidelli, Pietro et al.; "Augmented GradCAM: Heat-Maps Super Resolution Through Augmentation"; ICASSP 2020—2020 IEEE International Conference on Acoustics, Speech and Signal Processing (ICASSP); Barcelona, Spain, 2020.
Muccino, Eric; "Image Classification with Variable Input Resolution in Keras"; Mindboard, Inc.; Mar. 20, 2020.
Rosebrock, Adrian; "Grad-CAM: Visualize Class Activation Maps with Keras, TensorFlow, and Deep Learning"; Mar. 9, 2020; Blog downloaded from the Internet: https://www.pyimagesearch.com/2020/03/09/grad-cam-visualize-class-activation-maps-with-keras-tensorflow-and-deep-learning/.
Selvaraju, Ramprasaath R. et al.; Grad-CAM: Visual Explanations from Deep Networks via Gradient-Based Localization; arXiv.org > cs > arXiv:1610.02391; Submitted Oct. 7, 2016, Last Revised Dec. 3, 2019; https://doi.org/10.1007/s11263-019-01228-7.
Tagaris, Thanos et al.; "High-resolution Class Activation Mapping", 2019 IEEE International Conference on Image Processing (ICIP); Sep. 22-25, 2019, Taipei, Taiwan.
Tan, Mingxing, et al.; "EfficientDet: Scalable and Efficient Object Detection"; 2020 IEEE/CVF Conference on Computer Vision and Pattern Recognition (CVPR); Jun. 13-19, 2020; Seattle, Washington; DOI: 10.1109/CVPR42600.2020.01079.
Ulyanin, Stephan "Implementing Grad-CAM in PyTorch"; Feb. 21, 2019; Downloaded from the Internet: https://medium.com/@stepanulyanin/implementing-grad-cam-in-pytorch-ea0937c31e82.
U.S. Appl. No. 17/302,592; Inventor: Peter Doliwa; "Method For Generating Detailed Visualization Of Machine Learning Model Behavior;" filed May 7, 2021.

* cited by examiner

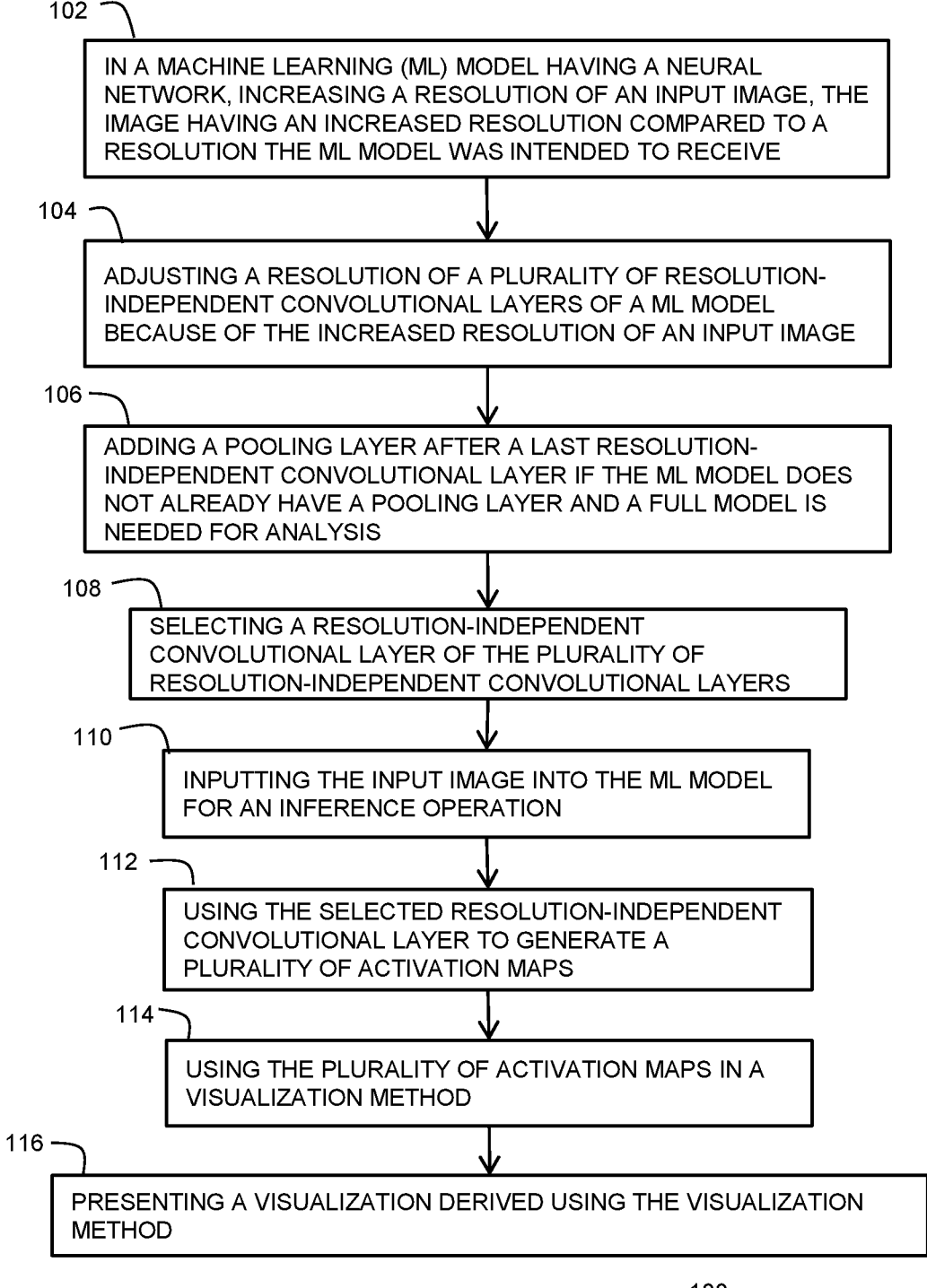

102 ⟍
IN A MACHINE LEARNING (ML) MODEL HAVING A NEURAL NETWORK, INCREASING A RESOLUTION OF AN INPUT IMAGE, THE IMAGE HAVING AN INCREASED RESOLUTION COMPARED TO A RESOLUTION THE ML MODEL WAS INTENDED TO RECEIVE

104 ⟍
ADJUSTING A RESOLUTION OF A PLURALITY OF RESOLUTION-INDEPENDENT CONVOLUTIONAL LAYERS OF A ML MODEL BECAUSE OF THE INCREASED RESOLUTION OF AN INPUT IMAGE

106 ⟍
ADDING A POOLING LAYER AFTER A LAST RESOLUTION-INDEPENDENT CONVOLUTIONAL LAYER IF THE ML MODEL DOES NOT ALREADY HAVE A POOLING LAYER AND A FULL MODEL IS NEEDED FOR ANALYSIS

108 ⟍
SELECTING A RESOLUTION-INDEPENDENT CONVOLUTIONAL LAYER OF THE PLURALITY OF RESOLUTION-INDEPENDENT CONVOLUTIONAL LAYERS

110 ⟍
INPUTTING THE INPUT IMAGE INTO THE ML MODEL FOR AN INFERENCE OPERATION

112 ⟍
USING THE SELECTED RESOLUTION-INDEPENDENT CONVOLUTIONAL LAYER TO GENERATE A PLURALITY OF ACTIVATION MAPS

114 ⟍
USING THE PLURALITY OF ACTIVATION MAPS IN A VISUALIZATION METHOD

116 ⟍
PRESENTING A VISUALIZATION DERIVED USING THE VISUALIZATION METHOD

METHOD FOR GENERATING A DETAILED VISUALIZATION OF MACHINE LEARNING MODEL BEHAVIOR

BACKGROUND

Field

This disclosure relates generally to machine learning, and more particularly, to a method for generating a more detailed visualization of machine learning (ML) model behavior.

Related Art

Machine learning (ML) is becoming more widely used in many of today's applications, such as applications involving forecasting and classification. In ML, improving human interpretability and explainability of results is important. A lack of understanding about how a ML model derives its conclusions makes it difficult to verify that the ML model is working as expected and no significant flaws of the model are overlooked. The lack of understanding can cause mistrust and security concerns that hinder the use of ML for important tasks.

Many different approaches exist to generate visualizations that show the user which parts of the input were the most important for the model to derive its conclusion. When used on a model for image classification, for example, these visualizations show the influence of each individual input pixel or groups of pixels on the classification result. Similar visualizations can also be applied to models used for object detection. All existing approaches have limitations that limit their use for explaining model behavior. Specifically, for convolutional neural networks (CNN), several variants of visualization methods have been developed. For example, Grad-CAM (gradient-weighted class activation mapping) and Ablation-CAM) generate heatmaps showing the most influential areas of the input for a target classification based on activation maps generated from a selected convolutional layer of the CNN. The current visualization methods are considered to generate good explanations in general and are relatively computationally inexpensive, but their ability to explain model behavior may be limited by their relatively low-resolution.

The low resolution is a direct result of the trade-off that is made when selecting a convolutional layer for the visualization. Heatmaps are noisier and generally less semantically meaningful towards the input of the CNN while the resolution is reduced towards the output of the CNN. This means that in order to generate the most meaningful visualizations the layer that is typically selected is close to the output of the network which results in a very low resolution. For example, some neural network architectures like MobileNetV2 require input images having a specific resolution, such as for example, 224×224 pixels. By the time the processing of the image through the CNN reaches the last convolutional layers, the resolution of the generated visualizations may be reduced to only 7×7 pixels. This low resolution makes it hard to interpret the visualizations in many cases, especially if smaller objects are involved or the classification decision of the model depends on finer details of the input. Similar constraints apply when using visualization methods like Grad-CAM on CNNs used for object detection, semantic segmentation, instance segmentation and other related tasks. Single shot object detectors also have the problem because they typically use a single set of activation maps for classifying multiple different objects of different sizes. The generated activation maps cover the full input image whereas object detectors typically detect objects that are only a small portion of the input image in size.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 illustrates a flowchart of a method for generating a visualization for explaining behavior of a ML model in accordance with an embodiment.

DETAILED DESCRIPTION

Figure 1:
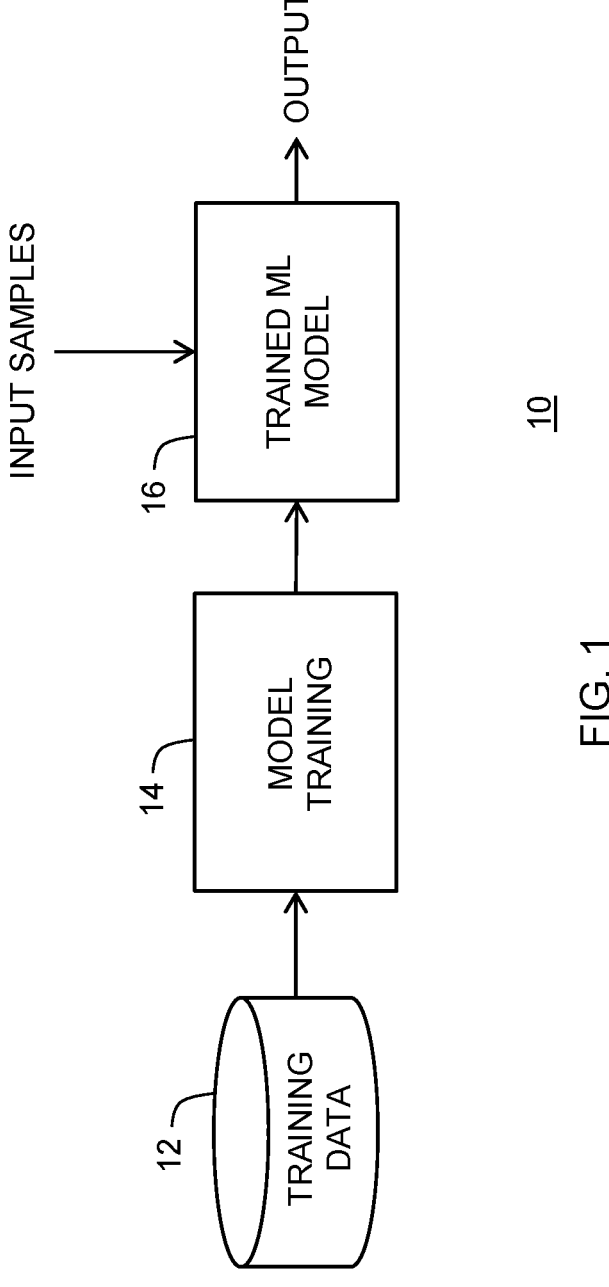
FIG. 1 illustrates a simplified system for training and using a ML model in accordance with an embodiment.

Generally, there is provided, a method for providing a more detailed visualization for explaining the behavior of a ML model. The method includes inputting an image into the ML model for an inference operation. A resolution of the input image is increased compared to a resolution the ML model was intended to receive as an input. The ML model includes a plurality of resolution-independent convolutional layers. Most layers of a CNN are resolution independent. In this disclosure, the term "resolution-independent" means that the resolution-independent layers are not sensitive to the changes in the resolution or the number of resolution-independent layers. That is, if a total number of resolution-independent convolutional layers of a neural network (NN) is changed, the change does not result in a change in the number of trainable parameters, like weights and biases, and no retraining of the NN is necessary. In accordance with an embodiment, the resolution of the plurality of resolution-independent convolutional layers is adjusted to accommodate the increased resolution of the input image. One layer of the plurality of resolution-independent convolutional layers is selected, and a plurality of activation maps is generated from the selected resolution-independent convolutional layer. The plurality of activation maps is used in a visualization method to generate a higher resolution visualization to show what features of the image were important for the ML model to derive a conclusion. The higher resolution provides a more detailed visualization for analyzing why the ML model came to a particular conclusion.

If only a partial model is needed for generating the visualization, that is, up to the selected resolution-independent convolutional layer, no further adjustments to the model are needed for generating the more detailed visualization. However, if the full model is needed, an additional layer may be inserted that adjusts the output sizes of the last resolution-independent convolutional layer to match the input sizes expected by the first resolution-dependent convolutional layer, e.g., an average pooling layer or max pooling layer. A visualization method is used on the increased resolution ML model to generate higher resolution visualizations that provide more detailed explanations of the model behavior. The method is applicable to all types of ML tasks where a neural network architecture is used that mostly has layers that are input resolution independent. The method may be used in, for example, ML models used for classification, object detection, semantic segmentation, instance segmentation, and other related tasks.

In accordance with an embodiment, there is provided, a method for generating a visualization for explaining a behavior of a machine learning (ML) model having a neural network, the method including: selecting an image for input to the ML model for an inference operation, wherein the image has an increased resolution compared to an image resolution the ML model was intended to receive as an input; adjusting a resolution of a plurality of resolution-independent convolutional layers of the neural network because of the increased resolution of the input image; selecting a resolution-independent convolutional layer of the neural network; inputting the input image into the ML model for the inference operation; using the selected resolution-independent convolutional layer to generate a plurality of activation maps; using the plurality of activation maps in a visualization method to generate the visualization to show which features of the image were important for the ML model to derive an inference conclusion; and presenting results of application of the visualization method for analysis. Selecting the resolution-independent convolutional layer may further include selecting a final convolutional layer of the plurality of resolution-independent convolutional layers. The visualization method may be the Grad-CAM (gradient-weighted class activation mapping) visualization method. Selecting the image for input to the ML model for an inference operation may further include upscaling the image to provide the increased resolution. The method may further include generating a plurality of heat maps from the plurality of activation maps to use in the visualization method. The neural network may be used for one of image classification, object detection, semantic segmentation, or instance segmentation. The method may further include adding a layer after a final resolution-independent convolutional layer of the plurality of resolution-independent convolutional layers to adjust for a mismatch between an output size of the final resolution-independent convolutional layer and an input of a first resolution-dependent layer. The added layer may include one of either an average pooling layer, max pooling layer, global average pooling layer, or global max pooling layer. The method may further include: adding a fully connected layer after the plurality of resolution-independent convolutional layers; and training only the added fully connected layer. The method of claim 10 may further include computing an average gradient for each activation map of the plurality of activation maps.

In accordance with another embodiment, there is provided, a computer program including instructions executable by a processor, for executing a method for generating a visualization for explaining a behavior of a machine learning (ML) model having a neural network, the executable instructions including: instructions for selecting an image for input to the ML model for an inference operation, wherein the image has an increased resolution compared to an image resolution the ML model was intended to receive as an input; instructions for adjusting a resolution of a plurality of resolution-independent convolutional layers of the neural network because of the increased resolution of the input image; instructions for selecting a resolution-independent convolutional layer of the neural network; instructions for inputting the input image into the ML model for the inference operation; instructions for using the selected resolution-independent convolutional layer to generate a plurality of activation maps; instructions for using the plurality of activation maps in a visualization method to generate the visualization to show which features of the image were important for the ML model to derive an inference conclusion; and instructions for presenting results of application of the visualization method for analysis. The instructions for selecting the convolutional layer may further include instructions for selecting a final convolutional layer of the plurality of resolution-independent convolutional layers. The visualization method may be a Grad-CAM (gradient-weighted class activation mapping) visualization method. The instructions for selecting the image for input to the ML model for an inference operation may further include instructions for upscaling the image to provide the increased resolution. The computer program may further include instructions for generating a plurality of heat maps from the plurality of activation maps to use in the visualization method. The neural network may be used for one of image classification, object detection, semantic segmentation, or instance segmentation. The computer program may further include instructions for adding a layer after a final convolutional layer of the plurality of resolution-independent convolutional layers to adjust for a mismatch between an output size of the final resolution-independent convolutional layer and an input of a first resolution-dependent layer. The added layer may include one of either an average pooling layer, max pooling layer, global average pooling layer, or global max pooling layer. The computer program may further include adding a fully connected layer after the plurality of resolution-independent convolutional layers; and training only the added fully connected layer. The computer program may further include computing an average gradient for each activation map of the plurality of activation maps.

As mentioned previously, to improve human interpretability and explainability of ML model behavior, many different approaches exist to generate visualizations that show the user which parts of the input are the most important for the model to derive its prediction. In case of an image classifier, for example, the visualization shows which parts of the input image are seen as the most important by the model for a given target class, which does not necessarily have to be the actual predicted class.

One widely used example for these visualization methods is Grad-CAM (Gradient-weighted Class Activation Mapping). Grad-CAM generates heatmaps showing the most influential areas of the input for a target classification based on a weighted sum of the activation maps of a selected convolutional layer. As weight factor for each activation map it uses average gradients towards increasing a logit for the target class as an estimation of the importance of each activation map for the target class. In a classifier the logits are intermediate output values of the model before a softmax activation is applied to calculate the confidence values as final output of the model. A trade-off is made when selecting a convolutional layer for Grad-CAM because the highest resolution is retained towards the beginning of the CNN, however more noise is present and heatmaps are semantically less meaningful. In order to generate the most meaningful visualizations a convolutional layer is typically selected that is close to the end of the network, i.e., the last convolutional layer.

Grad-CAM can also be applied to explain the predictions of an object detector CNN. Object detectors typically include a feature extractor consisting of a series of convolutional layers, and a number of heads. The heads output prediction classes, bounding boxes, masks, or key points based on extracted features. Some object detectors have a feature pyramid network (FPN) that uses lateral connections for extracting different feature maps (also called activation maps) for a number of object sizes or levels. The feature maps that are used by the various heads for small objects have a higher resolution than the feature maps that are used for relatively large objects. Two stage detectors crop or pool the region of interest from the feature maps such that only the region of interest is used by the heads. One stage detectors, on the other hand, do bounding box prediction and classification in parallel and use the full feature maps. To apply Grad-CAM to an object detector, a convolutional layer is selected from which to generate the feature maps. Here the same trade-off holds as does for classifiers: Layers close to the output of a feature extractor have high semantic value but low resolution and vice versa for layers close to the input. The feature extractor of the EfficientDet-DO (single stage) object detector, which has a FPN, outputs a single set of feature maps of 4×4 pixels for all (not each) of the largest objects and of 64×64 for all smallest objects. It is not uncommon that an object in the input image is covered by only 1 or 2 pixels in the feature map. A Grad-CAM heatmap which covers an object by only 1 or 2 pixels is not very helpful for identifying the parts of the object that are most influential to its classification. The following description focuses on CNNs used for image classification and Grad-CAM to explain the method, but its application is not restricted to these.

FIG. 1 illustrates a simplified system for training and using a ML model in accordance with an embodiment. System 10 includes labeled set of ML training data 12, model training block 14, and resulting trained ML model 16. In one embodiment, system 10 is implemented as a computer program stored on a non-transitory medium comprising instructions that are executable on a processor.

One example embodiment includes a neural network (NN) algorithm used to classify images. The NN is trained using a training data set 12. In another embodiment, training data set 12 may be used for object detection in an image. Various training data sets can be acquired, such as for example, the CIFAR10 data set for image classification and the PASCAL Visual Object Classes (VOC) data set for object classification. A ML algorithm for a vision-based classification problem only returns a single class label as the output prediction for an input image. A ML algorithm for an object detection problem, which is commonly referred to as an object detector can, on the other hand, return multiple output predictions for a single input image, one output prediction for every identified object. Every output prediction consists of a class label as well as a bounding box that contains the object. For discussion purposes, the ML model is based on a NN algorithm and the training data includes a plurality of images. In other embodiments, the ML algorithm and training data may be different.

The ML model is trained in model training 14 using training data 12 comprising a plurality of labeled images. The training data may include images that are labeled by classes, such as for example, bird, cat, dog, bus, traffic light, etc. If the ML model is to be used as an object detector, the training data includes images with more than one labeled object. After training, the trained ML model 16 can be used for inference operations. In an inference operation, one or more input samples labeled "INPUT SAMPLES" are input into ML model 16 and an output classification labeled "OUTPUT" is provided by the trained model.

FIG. 2 illustrates a flowchart of a method 100 for generating a visualization for explaining a behavior of a ML model in accordance with an embodiment. An input image is selected for analysis using a visualization method. The input image may be selected because it is not clear why the ML model classified an object of the image the way it did. Method 100 begins at step 102. At step 102, a resolution of the input image to the ML model is increased. The image resolution is increased to a resolution greater than a resolution the ML model was intended to receive. At step 104, a resolution of a plurality of resolution-independent convolutional layers is increased because of the increased resolution of the input image. At step 106, a pooling layer, e.g., an average pooling layer, may be added to the NN after a last resolution-independent convolutional layer if the ML model does not already have a pooling layer and a full model is needed for the analysis. At step 108, a resolution-independent convolutional layer of the plurality of resolution-independent layers is selected. In one embodiment, the selected resolution-independent layer is a last resolution-independent convolutional layer of the plurality of resolution-independent convolutional layers. At step 110, the input image having the increased resolution is input to the ML model for an inference operation. At step 112, the selected resolution-independent convolutional layer is used to generate a plurality of activation maps. At step 114, the plurality of activation maps is used to prepare the ML model for use in the visualization method. For example, the activation maps may be used by a visualization method such as Grad-CAM to generate heat maps. At step 116, a visualization derived from the visualization method is presented for analysis. Application of method 100 on an ML model allows higher resolution visualization without requiring any additional training of the ML model.

Figure 3:
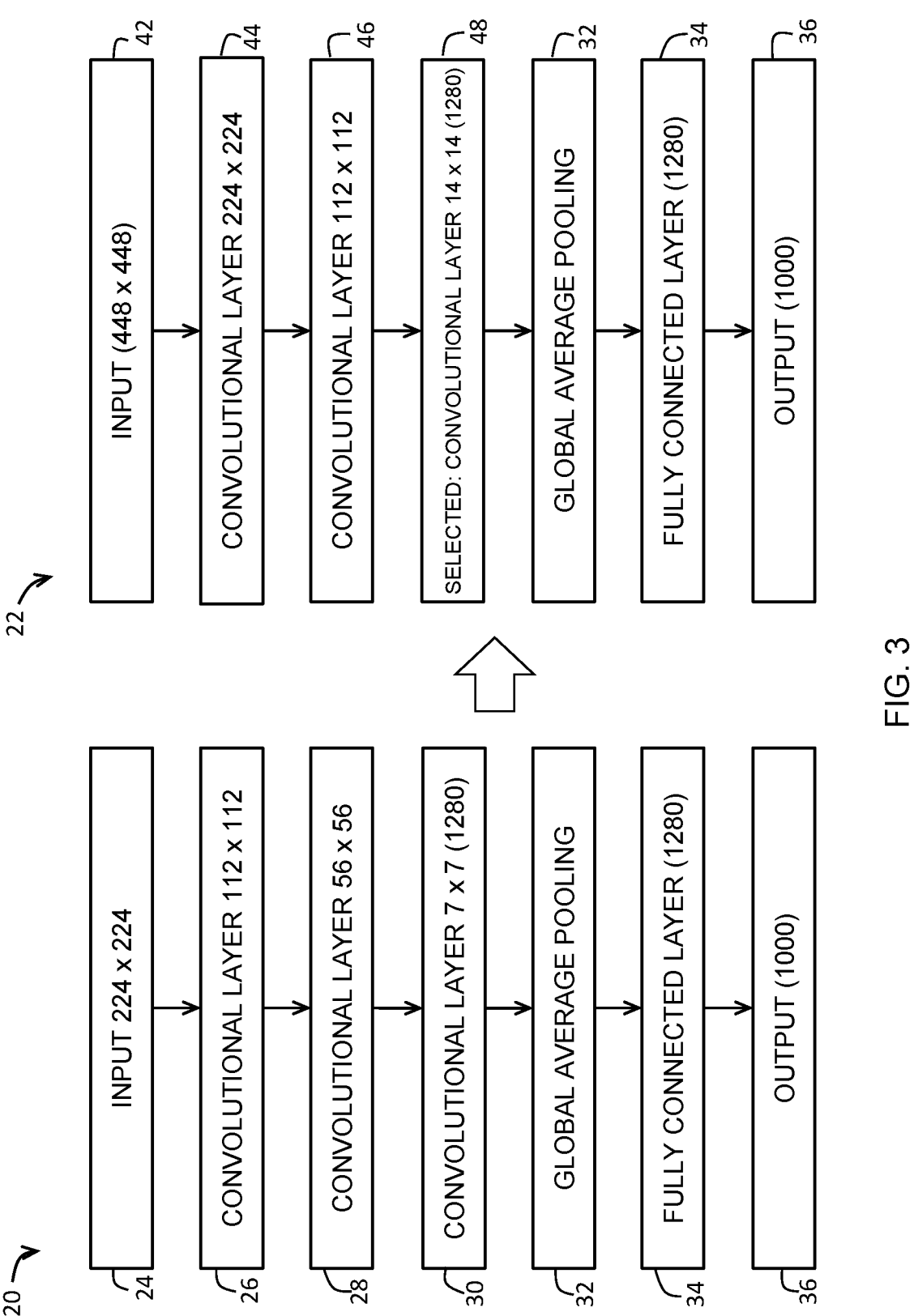
FIG. 3 illustrates a diagram of layers of a neural network for generating a higher resolution visualization in accordance with an embodiment.

FIG. 3 illustrates a diagram of layers of a neural network for generating a higher resolution visualization in accordance with an embodiment. FIG. 3 shows a NN 20 and a NN 22. Neural network 20 is a simplified illustration of a neural network before method 100 in FIG. 2 is applied. Neural network 22 is NN 20 after applying method 100 for generating a visualization for explaining a behavior of a ML model. Neural network 20 includes input 24, a plurality of resolution-independent convolutional layers 26, 28, and 30, global average pooling layer 32, fully connected layer 34, and output 36. There can be any number of resolution-independent convolutional layers. The number in parentheses ( ) of resolution-independent convolutional layer 30 and output 36 indicate the number of filters in those layers. The number in parentheses ( ) of fully connected layer 34 indicates the number of nodes in fully connected layer 34. For example, resolution-independent convolutional layer 30 has 1280 filters and fully connected layer 34 has 1280 nodes. Also, each layer includes the resolution in pixels. For example, NN 20 was intended to receive an input image at input 24 having a resolution of 224×224 pixels. The subsequent resolution-independent layers have resolutions based on the resolution of input 24, but that are progressively lower. For example, resolution-independent convolutional layer 26 provides a reduced resolution of 112×112 pixels, resolution-independent convolutional layer 28 provides a resolution of 56×56, and resolution-independent convolutional layer 30 provides a resolution of 7×7 pixels. Fully connected layer 34, and output layer 36 have a fixed resolution (resolution dependent) and follow the plurality of resolution-independent layers 26, 28, and 30. Global average pooling layer 32 is included in NN 20 to adjust the resolution of the last resolution-independent convolutional layer 30 to the fixed resolution required by fully connected layer 34 and output 36. A visualization method such as Grad-CAM may be applied to NN 20 in order to provide information that helps to understand why the ML model may have come to the conclusion it did.

In FIG. 3, NN 22 is the same as NN 20 except that method 100 is applied to NN 22. Neural network 22 includes input 42, a plurality of resolution-independent convolutional layers 44, 46, and 48, global average pooling layer 32, fully connected layer 34, and output 36. There can be any number of resolution-independent convolutional layers. As shown for NN 20, the number in parentheses ( ) of resolution-independent convolutional layer 48 and output 54 indicate the number of filters. The number in parentheses ( ) of fully connected layer 32 indicates the number of nodes. Neural network 20 was intended to receive an input image having a resolution of 224×224 pixels. As can be seen in FIG. 3, the resolution of input 42 is increased to 448×448 pixels. The resolution-independent layers that follow input 42 have their resolutions changed based on the resolution of input 42, but that are progressively lower as progress is made through NN 22. For example, resolution-independent convolutional layer 44 provides a reduced resolution of 224×224 compared to resolution-independent convolutional layer 26. Resolution-independent convolutional layer 46 provides a resolution of 112×112, and resolution-independent convolutional layer 48 is the last resolution-independent convolutional layer and provides a resolution of 14×14 pixels and has 1280 filters. In accordance with the method, one layer of the plurality of resolution-independent convolutional layers is selected, for example, the last resolution-independent convolutional layer 48. In another embodiment, the selected layer may be different. A visualization method such as Grad-CAM may be applied to ML model 22 in order to provide information that may help explain why NN 22 may have come to the conclusion it did. Assuming Grad-CAM to be the visualization method used to explain the behavior of NN 22, activation maps are generated from the selected resolution-independent convolutional layer 48. The activation maps are used by Grad-CAM to generate heat maps that can be used to provide the visualization. Because NN 20 already includes a global average pooling layer 32, an average pooling layer does not need to be added in NN 22 to adjust the resolution to the fixed resolution required by fully connected layer 34 and output 36. Nothing else is required to prepare NN 22 for running a visualization method like Grad-CAM on the increased resolution of selected convolutional layer 48 compared to convolutional layer 30. For example, no additional layers are added that require additional training. Note that in other embodiments, other layers may be used to adjust the size of the image between the resolution-independent layers and the resolution-dependent layers instead of global average pooling layer 32, such as a global max pooling layer.

The currently available visualization methods for providing interpretability and explainability are considered to generate good explanations in general and are relatively computationally inexpensive, but their ability to explain model behavior is limited by low resolution. The low resolution is a direct result of the trade-off that is made when selecting a convolutional layer for the visualization. For example, more noise is present and heatmaps are less semantically meaningful towards the input of the NN while the resolution increases reduced towards the output of the NN. This means that in order to generate the most meaningful visualizations the layer that is typically selected is very close to the output of the network which results in a low resolution. For example, when using a neural network architecture such as MobileNetv2, input images may have a resolution of 224×224 pixels. By the time the processing moves to one of the last convolutional layers the resolution of the generated visualizations may be reduced to only 7×7 pixels. This low resolution may be sufficient for determining, for example, classification predictions, but in many cases makes it difficult to interpret visualizations, especially if smaller objects are involved or the classification decision of the model depends on finer details of the input.

As most layers of a CNN are resolution-independent, usually from the input to a few layers before the output, these layers can be adjusted according to the increased input resolution. That is, their input and output sizes can be increased as described above and shown in FIG. 3. Further modifications of the model to adjust for the increased input size depend on the visualization method used. In case of Grad-CAM, the activation maps of the selected convolutional layer and the global average of the gradients for each activation map are needed. To retrieve the activation maps, only the partial model up to the selected convolutional layer is needed. But to calculate the gradients, the complete model is needed. If the model already includes a layer that always has the same output size regardless of the size of its input, e.g., a global average pooling layer or a global max pooling layer as shown in FIG. 3, no further modification of the model is required.

Figure 4:
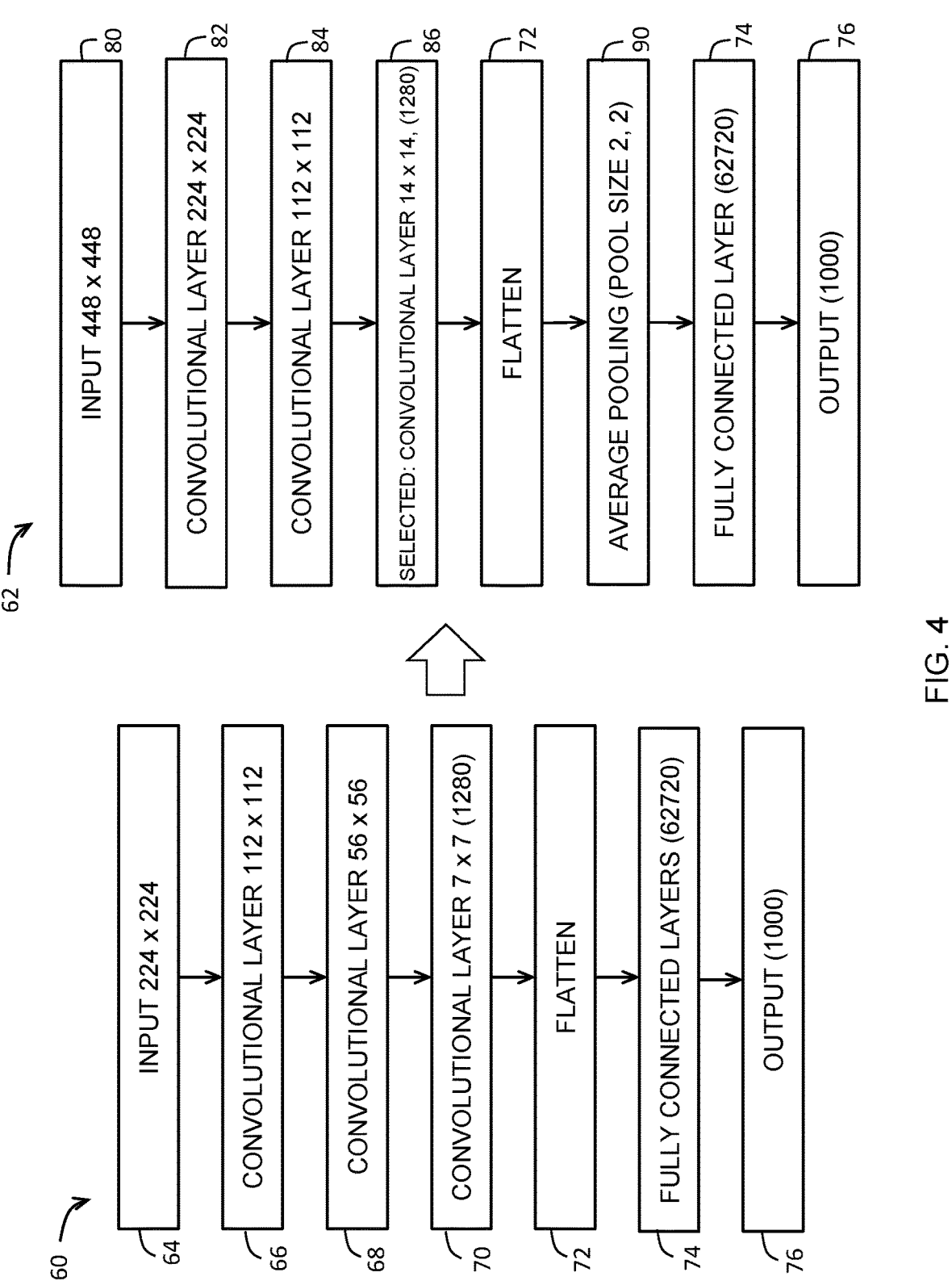
FIG. 4 illustrates a diagram of layers of a neural network for generating a higher resolution visualization in accordance with another embodiment.

FIG. 4 illustrates a diagram of layers of a neural network for generating a higher resolution visualization in accordance with another embodiment. FIG. 4 illustrates the case where a ML model does not have a layer, such as a global average pooling layer, that always has the same output size regardless of the size of the input to the layer. Neural network 60 is a simplified illustration of a neural network before application of the method. Neural network 62 is NN 60 after method 100 is applied to NN 60 according to another embodiment. Neural network 60 includes input 64, a plurality of resolution-independent convolutional layers 66, 68, and 70, flatten layer 72, fully connected layer 74, and output 76. There can be any number of resolution-independent convolutional layers. The number in parentheses ( ) of resolution-independent convolutional layer 70 and output 76 indicate the number of filters. The number in parentheses ( ) of fully connected layer 74 indicates the number of nodes. The resolution of the layers is provided in pixels. Neural network 60 was intended to receive an input image having a resolution of 224×224 pixels. The subsequent resolution-independent layers have resolutions based on the resolution of input 64, but that are progressively lower. For example, resolution-independent convolutional layer 66 provides a reduced resolution of 112×112, resolution-independent convolutional layer 68 provides a resolution of 56×56, and resolution-independent convolutional layer 70 provides a resolution of 7×7 pixels. Fully connected layer 74, and output layer 76 have a fixed resolution and follow the plurality of resolution-independent layers 66, 68, and 70. Unlike NN 20 in FIG. 3, NN 60 does not already have a global average pooling layer to adjust the resolution of the last resolution-independent layer to the fixed resolution required by fixed resolution layers such as a fully connected layer and output.

In FIG. 4, NN 62 includes input 80, plurality of resolution-independent convolutional layers 82, 84, and 86, flatten layer 72, average pooling layer 90, fully connected layer 74, and output 76. There can be any number of resolution-independent convolutional layers. The number in parentheses ( ) of resolution-independent convolutional layer 86 and output 76 indicate the number of filters. The number in parentheses ( ) of fully connected layer 74 indicates the number of nodes. Neural network 60 was intended to receive an input image having a resolution of 224×224 pixels. As can be seen in FIG. 4, the resolution of input 80 is increased to 448×448 pixels. The resolution-independent convolutional layers that follow input 80 have their resolutions changed based on the resolution of input 80 but are progressively lower as processing continues through ML model 62. For example, resolution-independent convolutional layer 82 provides a reduced resolution of 224×224 pixels, resolution-independent convolutional layer 84 provides a resolution of 112×112 pixels, and resolution-independent convolutional layer 86 provides a resolution of 14×14 pixels. In accordance with the method, one layer of the plurality of resolution-independent convolutional layers is selected, for example, the last resolution-independent convolutional layer 86. In another embodiment, the selected layer may be different. As shown for NN 62, average pooling layer 90 is inserted after the last resolution-independent layer 86 and between flatten layer 72 and fully connected layer 74, to adjust for a mismatch between the output size of last resolution-independent convolutional layer 86 and the expected input size of the first resolution-dependent layer. To avoid deviating too much from the original model architecture, a layer of the same type that is already used in the original model should be inserted to reduce the output size of the last resolution-independent layer to the expected input size of the first resolution-dependent layer. Typically, this is an average pooling layer or max pooling layer because average pooling layers and max pooling layers have the advantage of not containing trainable weights and therefore do not require training. Other layers, such as a max pooling layer or global max pooling layer may also be used for adjusting the resolution to the required resolution after the last resolution-independent layer. The resulting complete model adjusted for a higher resolution input can then be used with any visualization method. For example, a visualization method such as Grad-CAM may be applied to ML model 62 in order to disclose why ML model 62 may have come to the conclusion it did. Assuming Grad-CAM to be the visualization method used to explain the behavior of ML model 62, activation maps are generated from the selected resolution-independent convolutional layer 86. The activation maps are used by Grad-CAM to generate heat maps that can be used to provide the visualization. Like NN 22, after the modifications, no further training is required before NN 62 can be used for inference operations.

Alternatively, because only the average of the gradients is needed for each activation map as weight factors, a simpler approach can be used where Grad-CAM is applied to the increased resolution activation maps retrieved from the higher resolution partial model up to the selected convolutional layer. The weight factors may be derived from gradients computed over lower resolution feature maps of the original model. Experiments have shown that results from both approaches are very similar, and that results from models with a global pooling layer are even the same regardless of which approach was used.

In another embodiment, to create a complete ML model adapted to the increased input resolution, a fully connected layer or another layer that requires training, e.g., an additional convolutional layer followed by a pooling layer can be added. The additional convolutional layer should be similar to convolutional blocks that already exist in the ML model to create a consistent architecture. Only the additional convolutional layer is trained while keeping the weights of the already trained layers frozen.

Because method 100 in FIG. 2 presents higher resolution images to convolutional kernels trained on the original image size, it might be expected that for certain ML models and datasets, using the increased resolution images as described leads to bad interpretability results. However, bad interpretability results have not been observed in ImageNet models, because the objects in ImageNet are already of various sizes in relation to the input frame. However, if this is not the case for a specific ML model, the convolutional layer kernels for the higher resolution model are increased as well and interpolated. Retraining on the resulting adapted model can then be conducted while freezing the fully connected layers. In this case, it is expected that the bigger kernels learn a similar view compared to the original kernels, while gaining a higher resolution visualization result.

Because method 100 allows heatmaps to be generated for the same input image in various resolutions, it can also be used to combine heatmaps with different resolutions into one heatmap by, e.g., simply adding or multiplying heatmaps to generate a combined heatmap that retains the information from an original heatmap but adds additional details from higher resolution heatmaps.

Increased resolution images are needed as input for the adjusted ML model. If the input image is already available in higher resolution, which is often the case because the input image may have been first downscaled before being fed into the original model, then an increased resolution image can be used without modification, or after an increased resolution image is downscaled to the required increased resolution. Otherwise, a lower resolution input image needs to be upscaled to the increased resolution using an image interpolation algorithm.

The disclosed embodiments are applicable to all types of ML where images or video, i.e., a stream of multiple images, are used as input or where the input is treated as if it were an image, for example in image classification or image object detection use cases. For these applications, CNNs are the most commonly used type of ML models. As mentioned previously, to improve explainability of the ML model behavior, many different approaches exist to generate visualizations that show the user which parts of the input are the most important for the model to derive its conclusion. In case of an image classifier the visualization shows which parts or features of the input image are considered to be the most important by the model for a given target class. The target class does not necessarily have to be the actual predicted class.

The disclosed embodiments improve the resolution of the visualizations used to visualize the influence or importance of individual pixels or groups of pixels of an inputted image. This allows a user to visualize finer details that help explain model behavior in cases where the original resolution is not enough or that help to increase confidence in the interpretation of model behavior. For example, when examining misclassifications there are many cases where the visualizations for correct class and predicted class are very close to each other. The effectiveness of method 100 is generally independent of an object size or feature size. Because the low resolution of current visualization methods makes it difficult to interpret ML model decisions for small objects, this method can help interpret ML model behavior.

This method is applicable to all kinds of ML tasks where a mostly resolution-independent architecture (e.g. CNN) is used, for example tasks such as image classification, object detection, semantic segmentation, or instance segmentation. In addition, this method is able to improve the resolution of any visualization method that is based on any combination of increased resolution activation maps, increased resolution gradients (e.g. Grad-CAM, Ablation-CAM and related methods) or the increased resolution input (e.g. occlusion sensitivity and related methods).

Figure 5:
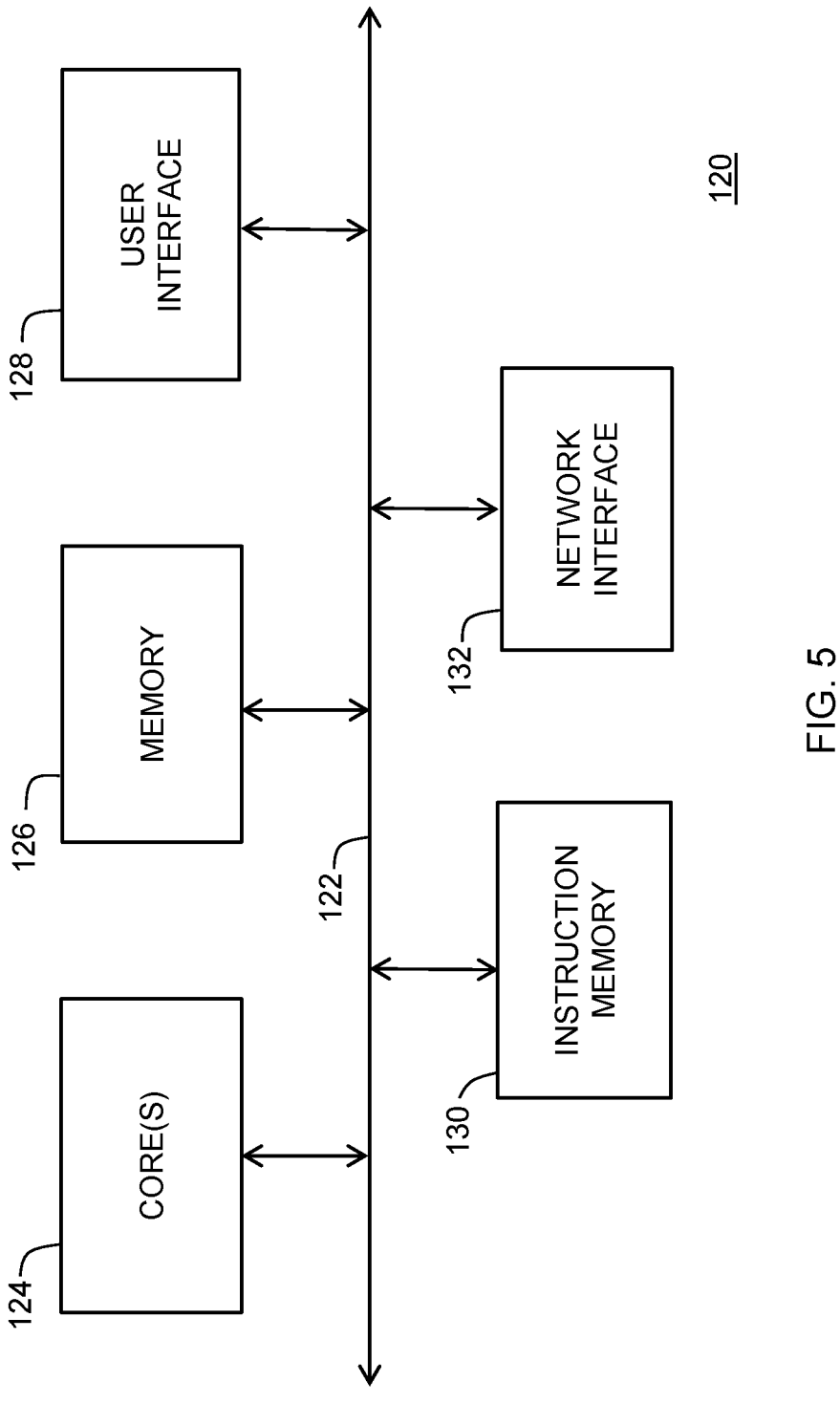
FIG. 5 illustrates a data processing system useful for implementing an embodiment of the present invention.

FIG. 5 illustrates data processing system 120 useful for implementing an embodiment of the present invention. Data processing system 120 may be implemented on one or more integrated circuits and may be used in an implementation of the described embodiments. Data processing system 120 includes bus 122. Bus 122 may be another type of interconnection network, such as a switch network. Connected to bus 122 is one or more processor cores 124, memory 126, user interface 128, instruction memory 130, and network interface 132. The one or more processor cores 124 may include any hardware device capable of executing instructions stored in memory 126 or instruction memory 130. For example, processor cores 124 may execute the machine learning algorithms used for training and operating the ML model. Processor cores 124 may be used to execute the method for explainability described herein. Processor cores 124 may be, for example, a microprocessor, field programmable gate array (FPGA), application-specific integrated circuit (ASIC), or similar device. Processor cores 124 may be implemented in a secure hardware element and may be tamper resistant.

Memory 126 may be any kind of memory, such as for example, L1, L2, or L3 cache or system memory. Memory 126 may include volatile memory such as static random-access memory (SRAM) or dynamic RAM (DRAM), or may include non-volatile memory such as flash memory, read only memory (ROM), or other volatile or non-volatile memory. Also, memory 126 may be implemented in a secure hardware element. Alternately, memory 66 may be a hard drive implemented externally to data processing system 120. In one embodiment, memory 126 may be used to store weight matrices for the ML model.

User interface 128 may be connected to one or more devices for enabling communication with a user such as an administrator. For example, user interface 128 may be enabled for coupling to a display, a mouse, a keyboard, or other input/output device. Network interface 132 may include one or more devices for enabling communication with other hardware devices. For example, network interface 132 may include, or be coupled to, a network interface card (NIC) configured to communicate according to the Ethernet protocol. Also, network interface 132 may implement a TCP/IP stack for communication according to the TCP/IP protocols. Data samples for classification may be input via network interface 132, or similar interface. Various other hardware or configurations for communicating are available.

Instruction memory 130 may include one or more machine-readable storage media for storing instructions for execution by processor cores 124. In other embodiments, both memories 126 and 130 may store data upon which processor cores 124 may operate. Memories 126 and 130 may store instructions for implementing method 100. Also, memories 126 and 130 may also store other applications, such as for example, encryption, decryption, and verification applications. Memories 126 and 130 may be implemented in a secure hardware element and be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for generating a visualization for explaining a behavior of a machine learning (ML) model having a neural network, the method comprising:

selecting an image for input to the ML model for an inference operation, wherein the image has an increased resolution compared to an image resolution the ML model was intended to receive as an input;

increasing a resolution of a plurality of resolution-independent convolutional layers of the neural network because of the increased resolution of the input image that is selected for the inference operation;

selecting a resolution-independent convolutional layer of the neural network;

inputting the input image into the ML model for the inference operation;

using the selected resolution-independent convolutional layer to generate a plurality of activation maps;

using the plurality of activation maps in a visualization method to generate the visualization to show a user which features of the image were important for the ML model to derive an inference conclusion; and presenting results of application of the visualization method to the user on a display for analysis.

2. The method of claim 1, wherein selecting the resolution-independent convolutional layer further comprises selecting a final convolutional layer of the plurality of resolution-independent convolutional layers.

3. The method of claim 1, wherein the visualization method is a Grad-CAM (gradient-weighted class activation mapping) visualization method.

4. The method of claim 1, wherein selecting the image for input to the ML model for an inference operation further comprises upscaling the image to provide the increased resolution.

5. The method of claim 1, further comprising generating a plurality of heat maps from the plurality of activation maps to use in the visualization method.

6. The method of claim 1, wherein the neural network is used for one of image classification, object detection, semantic segmentation, or instance segmentation.

7. The method of claim 1, further comprising adding a layer after a final resolution-independent convolutional layer of the plurality of resolution-independent convolutional layers to adjust for a mismatch between an output size of the final resolution-independent convolutional layer and an input of a first resolution-dependent layer.

8. The method of claim 7, wherein the added layer comprises one of either an average pooling layer, max pooling layer, global average pooling layer, or global max pooling layer.

9. The method of claim 1, further comprising:

adding a fully connected layer after the plurality of resolution-independent convolutional layers; and training only the added fully connected layer.

10. The method of claim 1, further comprising computing an average gradient for each activation map of the plurality of activation maps.

11. A computer program comprising instructions executable by a processor, for executing a method for generating a visualization for explaining a behavior of a machine learning (ML) model having a neural network, the executable instructions comprising:

instructions for selecting an image for input to the ML model for an inference operation, wherein the image has an increased resolution compared to an image resolution the ML model was intended to receive as an input;

instructions for increasing a resolution of a plurality of resolution-independent convolutional layers of the neural network because of the increased resolution of the input image;

instructions for selecting a resolution-independent convolutional layer of the neural network;

instructions for inputting the input image into the ML model for the inference operation;

instructions for using the selected resolution-independent convolutional layer to generate a plurality of activation maps;

instructions for using the plurality of activation maps in a visualization method to generate the visualization to show a user which features of the image were important for the ML model to derive an inference conclusion; and instructions for presenting results of application of the visualization method to the user on a display for analysis.

12. The computer program of claim 11, wherein the instructions for selecting the convolutional layer further comprises instructions for selecting a final convolutional layer of the plurality of resolution-independent convolutional layers.

13. The computer program of claim 11, wherein the visualization method is a Grad-CAM (gradient-weighted class activation mapping) visualization method.

14. The computer program of claim 11, wherein the instructions for selecting the image for input to the ML model for an inference operation further comprises instructions for upscaling the image to provide the increased resolution.

15. The computer program of claim 11, further comprising instructions for generating a plurality of heat maps from the plurality of activation maps to use in the visualization method.

16. The computer program of claim 11, wherein the neural network is used for one of image classification, object detection, semantic segmentation, or instance segmentation.

17. The computer program of claim 11, further comprising instructions for adding a layer after a final convolutional layer of the plurality of resolution-independent convolutional layers to adjust for a mismatch between an output size of the final resolution-independent convolutional layer and an input of a first resolution-dependent layer.

18. The computer program of claim 17, wherein the added layer comprises one of either an average pooling layer, max pooling layer, global average pooling layer, or global max pooling layer.

19. The computer program of claim 11, further comprising:

adding a fully connected layer after the plurality of resolution-independent convolutional layers; and training only the added fully connected layer.

20. The computer program of claim 11, further comprising computing an average gradient for each activation map of the plurality of activation maps.

\* \* \* \* \*